United States Patent [19]

Niimi

[11] E Re. 31,004

[45] Reissued Aug. 3, 1982

[54] ELECTRONIC MUSICAL INSTRUMENT UTILIZING DATA PROCESSING SYSTEM

[75] Inventor: Koji Niimi, Hamamatsu, Japan

[73] Assignee: Nippon Gakki Seizo Kabushiki Kaisha, Hamamatsu, Japan

[21] Appl. No.: 230,348

[22] Filed: Jan. 30, 1981

Related U.S. Patent Documents

Reissue of:

[64] Patent No.: 4,184,400
Issued: Jan. 22, 1980
Appl. No.: 860,100
Filed: Dec. 13, 1977

[30] Foreign Application Priority Data

Dec. 17, 1976 [JP] Japan ..... 51-150830

[51] Int. Cl.[3] ..... G10F 1/00
[52] U.S. Cl. ..... 84/1.01; 84/1.03
[58] Field of Search ..... 84/1.03, 1.01, 1.19, 84/1.24, 1.26

[56] References Cited

U.S. PATENT DOCUMENTS

| | | | |
|---|---|---|---|
| 3,878,750 | 4/1975 | Kapps | 84/1.03 |
| 3,915,047 | 10/1975 | Davis | 84/1.03 |
| 4,010,667 | 3/1977 | Kniepkamp | 84/1.03 |
| 4,041,825 | 8/1977 | Pascetta | 84/1.03 |
| 4,078,465 | 3/1978 | Wheelwright | 84/1.03 |
| 4,082,027 | 4/1978 | Hiyoshi et al. | 84/1.03 |
| 4,202,234 | 5/1980 | Comerford | 84/1.19 |
| 4,215,617 | 8/1980 | Moorer | 84/1.03 |

*Primary Examiner*—J. V. Truhe
*Assistant Examiner*—Forester W. Isen
*Attorney, Agent, or Firm*—Spensley, Horn, Jubas & Lubitz

[57] ABSTRACT

A CPU of a computer, or preferably a so-called microprocessor controls the tone waveshape generation. A tone generator unit, an instrument keyboard unit, a tone quality control unit are connected to a common data bus to which the CPU and the associated memories are also connected. Thus, the tone generator unit may be considered as a terminal unit of a computer system. Hence, the freedom in selecting the algorithm for generating a waveshape and the freedom in selecting and changing the parameters related to the waveshape generation are substantially increased. And therefore a gradually changing waveshape is very easily generated in one embodiment of this invention.

31 Claims, 8 Drawing Figures

| OCC | (83) | | | | | | | | | | | | | | | | | | | |
|---|---|---|---|---|---|---|---|---|---|---|---|---|---|---|---|---|---|---|---|---|
| | C9 | C8 | C7 | C6 | C5 | C4 | C3 | C2 | C1 | C0 | | | | | | | | | | |
| 0 0 0 | a9 | a8 | a7 | a6 | a5 | a4 | a3 | a2 | a1 | a0 | | | | | | | | | | |
| 0 0 1 | | a9 | a8 | a7 | a6 | a5 | a4 | a3 | a2 | a1 | 0 | | | | | | | | | |
| 0 1 0 | | | a9 | a8 | a7 | a6 | a5 | a4 | a3 | a2 | 0 | 0 | | | | | | | | |
| 0 1 1 | | | | a9 | a8 | a7 | a6 | a5 | a4 | a3 | 0 | 0 | 0 | | | | | | | |
| 1 0 0 | | | | | a9 | a8 | a7 | a6 | a5 | a4 | 0 | 0 | 0 | 0 | | | | | | |
| 1 0 1 | | | | | | a9 | a8 | a7 | a6 | a5 | 0 | 0 | 0 | 0 | 0 | | | | | |
| 1 1 0 | | | | | | | a9 | a8 | a7 | a6 | 0 | 0 | 0 | 0 | 0 | 0 | | | | |
| 1 1 1 | | | | | | | | a9 | a8 | a7 | 0 | 0 | 0 | 0 | 0 | 0 | 0 | | | |

ELECTRONIC MUSICAL INSTRUMENT UTILIZING DATA PROCESSING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an electronic musical instrument, and more particularly, to an electronic musical instrument wherein tones are produced through data-processing by a digital computer.

Various systems have heretofore been proposed as for the digital waveshape generation and for the computer control of a musical instrument. For example, in the U.S. Pat. No. 3,809,786 entitled COMPUTOR ORGAN, Fourier components of a periodic waveshape are computed separately at each sample point, and these components are algebraically added to obtain the waveshape amplitude at the sample point. And in the U.S. Pat. No. 3,692,087 entitled COMPUTIZED ORGAN REGISTRATION AFFECTING SYSTEM, stops and couplers of a pipe organ are controlled by a computer. But, in all the heretofore known systems, only a part of the total system of a musical instrument is controlled by a computer, as described in the foregoing two examples. And therefore, the variety of the generated waveshapes in the heretofore known systems is naturally limited.

On the other hand, players of the electronic musical instruments may wish to have a wide freedom in the selection of a tone quality. For example, a tone quality selected out of a group of various predetermined tone qualities may not be satisfactory for a player, and he may wish to create a new type of tone quality which is most adapted for the expected effect of the performance on the instrument. Any one of the heretofore known electronic musical instruments can not satisfy these requirements of the players.

SUMMARY OF THE INVENTION

Therefore, the general object of this invention is to provide an electronic musical instrument in which the freedom in selecting the tone quality is substantially improved. This objective is achieved by a relatively simple circuit disclosed by the present invention, wherein each component unit of an electronic musical instrument, for example, such a unit as the instrument keyboard unit, the tone quality control unit, and the tone generator unit, is connected to a common data bus as a terminal equipment of an electronic computer through the corresponding interface, the CPU(central processing unit) and the associated memories being also connected to the common data bus.

More particularly, an object of this invention is to provide an electronic musical instrument in which the player of the instrument can determine as he pleases the values of the parameters which affect the generated waveshapes, and also he can determine the algorithm by which the tone waveshapes are generated.

Another object of this invention is to provide a system of an electronic musical instrument in which the system expansion is easily and economically achieved. Since a common data bus has no limitation for a parallel connection of various terminal units, the system of this invention will be expanded when some terminal unit is connected in parallel to the common data bus. For example, a single instrument keyboard unit is connected to the common data bus and a single player performs on this instrument, but two tone generator units may be connected to the same common data bus. These two tone generator units may produce a same musical tone, or these two tone generator units may produce mutually different musical tone in accordance with the control program designed for the purpose.

Still another object of this invention is to provide a system of an electronic musical instrument wherein the signals on the common data bus are transmitted by a communication channel to a remote place where a tone generator unit(or units) is controlled by the signals, or a system of an electronic musical instrument wherein the signals on the common data bus are recorded to be reproduced to control a tone generator unit(or units).

Further, an important object of this invention is to provide a compact and inexpensive electronic musical instrument. Recently a so-called microprocessor can be obtained in a general market. The microprocessor has all the necessary functions of a CPU for a specified purpose, and is integrated in one single LSI(large scale IC) or in a few LSIs. Since the microprocessor is compact and inexpensive, an electronic musical instrument of this invention will be compact and inexpensive when a microprocessor is employed for the CPU.

For a better understanding of the invention, its operating advantages, and specific objects attained by its use, reference should be had to the accompanying drawings and descriptive matter thereof in which there are illustrated and described several preferred embodiments of this invention.

DESCRIPTION OF THE PREFERRED EMBODIMENTS

Figure 1:
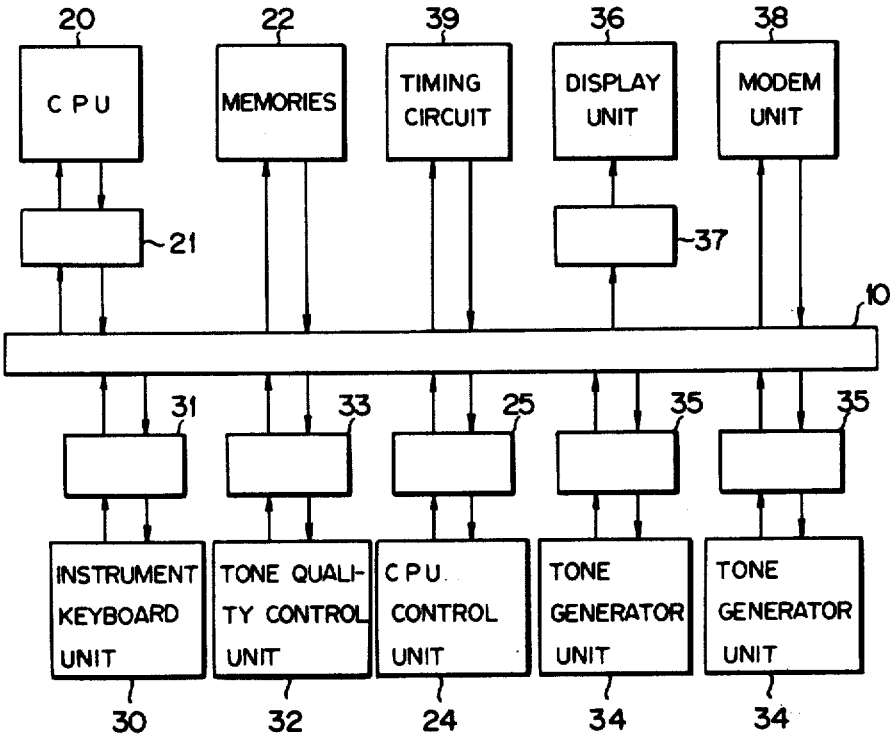
FIG. 1 is a block diagram of an embodiment of this invention.

Referring now to FIG. 1, there is shown a block diagram of an embodiment of this invention. In FIG. 1, numeral 10 represents a common data bus, and numeral 20 is a CPU of this invention. In this specification, a CPU means an equipment which has a general data processing function for processing input data from the input terminal units, the data processing being executed by the control circuits, the arithmetic logic units, and the registers in the CPU together with the associated memories; and the processed data are output to the corresponding terminal units through the common data bus 10. In preferred embodiments of this invention, a microprocessor will be used for the CPU 20. Numeral 21 is an interface for the CPU 20, numeral 22 shows associated memories, numeral 24 is a CPU control unit, and numeral 25 is an interface for the CPU control unit 24. The algorithm of the data processing in the CPU 20 is determined by the program stored in the memories 22 and by the control signal transmitted from the CPU control unit 24. Since an abundant variety of programs can be stored in the memories 22, and since the programs stored in the memories 22 can be easily altered, the algorithm of the data processing can be changed as desired.

Numeral 30 is an instrument keyboard unit, numeral 31 is an interface for the instrument keyboard unit 30, numeral 32 is a tone quality control unit, numeral 33 is an interface for the tone quality control unit 32, numeral 34 is a tone generator unit, numeral 35 is an interface for the tone generator unit 34, numeral 36 is a display unit, numeral 37 is an interface for the display unit, numeral 38 is a MODEM (modulator and demodulator) unit, and numeral 39 is a timing circuit.

It must be reminded that, in all the heretofore known electronic musical instruments, all the interconnections between the instrument keyboard unit, tone quality control unit, the memories, and the tone generator unit have respective (exclusive) hardwared connections. In the present invention, the common data bus 10 is used for these interconnections to improve the flexibility of the connection.

In the circuit shown by FIG. 1, signals exchanged among the terminal units through the common data bus 10 may be classified as shown in the following table Table 1.

TABLE 1

| Signals from \ Signals to | CPU 20 | Memories 22 | Tone Generator Unit 34 | MODEM Unit 38 | Display Unit 36 |
|---|---|---|---|---|---|
| CPU 20 | | $S_{12}$ | $S_{16}$ | $S_{17}$ | $S_{18}$ |
| Memories 22 | $S_{21}$ | | | | |
| Instrument Keyboard Unit 30 | $S_{31}$ | $S_{32}$ | ($S_{36}$) | ($S_{37}$) | $S_{38}$ |
| Tone Quality Control Unit 32 | $S_{41}$ | $S_{42}$ | ($S_{46}$) | ($S_{47}$) | $S_{48}$ |
| CPU Control Unit 24 | $S_{51}$ | | | | |

In Table 1, the signals $S_{12}$ include the instructions for writing and reading of the memories 22, the signals $S_{16}$ include signals for controlling the tone waveshape generation and for determining the tone quality, these signals being produced at the CPU 20 from signals $S_{31}$ and $S_{41}$, the signals $S_{21}$ include signals of instruction and the data transmitted to the CPU unit 20, the signals $S_{31}$ include the ON-OFF signal of the key switch and the key data signals, the signals $S_{41}$ include signals for determining the tone quality, the signals $S_{32}$ and $S_{42}$ mean the direct access to the memories 22, the signals $S_{36}$ include ON-OFF signal of the key switch and the key data signals, the signals $S_{46}$ include signals for determining the tone quality, and the signals $S_{51}$ include signals for selecting the program to be executed and other signals for directly controlling the CPU unit 20.

In preferred embodiments, the signals $S_{31}$ and $S_{41}$ are processed in the CPU 20 to generate the signals $S_{16}$ which control the tone generator unit 34. But in some embodiments, the tone generator unit 34 may be directly controlled by the signals $S_{36}$ and $S_{46}$.

It will be obvious that the signals $S_{17}$, $S_{37}$, and $S_{47}$ are the same or similar to the signals $S_{16}$, $S_{36}$, and $S_{46}$ respectively. Signals $S_{18}$, $S_{38}$, and $S_{48}$ are signals for indicating the status of the CPU unit 20 and other terminal units. An adequate status display is desirable for the succeeding control of the system.

Of all these signals, the signals $S_{12}$, $S_{21}$, and $S_{51}$ have the same nature with the signals exchanged among the corresponding units of the conventional computer systems employed for universal data processing, and therefore, further description of these signals will not be necessary.

In some embodiments of this invention, another CPU (or CPUs) and/or other external memories may also be connected to the common data bus 10. The signals to and from this supplementary CPU and this supplementary memories in these embodiments of this invention is the same to the signals to and from the supplementary CPU and the supplementary memories in a conventional computer unit and will need no further description.

The format of the data word or that of the instruction word for representing these signals will be determined in accordance with the design requirements. In a general case, one word which represents one signal of these signals will be composed of an address part, an instruction part, and a data part. Furthermore, this address part may be subdivided into a machine address, a device address, and a register address. The machine address specifies the types of the terminal unit as illustrated in FIG. 1, the device address specifies one particular device of the plural devices of a same terminal unit, as in case when two tone generator units are connected in parallel to a same common data bus, and the register address specifies a particular register in a terminal unit.

These words are transmitted through the common data bus 10 in a bit serial form in ordinary embodiments. And the data part and the instruction part of the word are stored in the corresponding registers. The data part of the word will be called a data code and the instruction part of the word will be called an instruction code. Loading a data code or an instruction code to a register from a bit serially arranged word, or transmitting a bit serially arranged word from a stored code in a register is a well known technic in the field of a digital circuit, and therefore, descriptions on these serial/parallel code conversion will be omitted in the following explanations.

In the circuit as shown by FIG. 1, the priority of interruption is predetermined for all the terminal units, and an interruption from a terminal unit will be dealt in accordance with this predetermined priority. As in a conventional computer, the CPU 20 will accept and deal with these interruptions, select the program to be executed, and control jumps, halts, and queuings.

Figure 2:
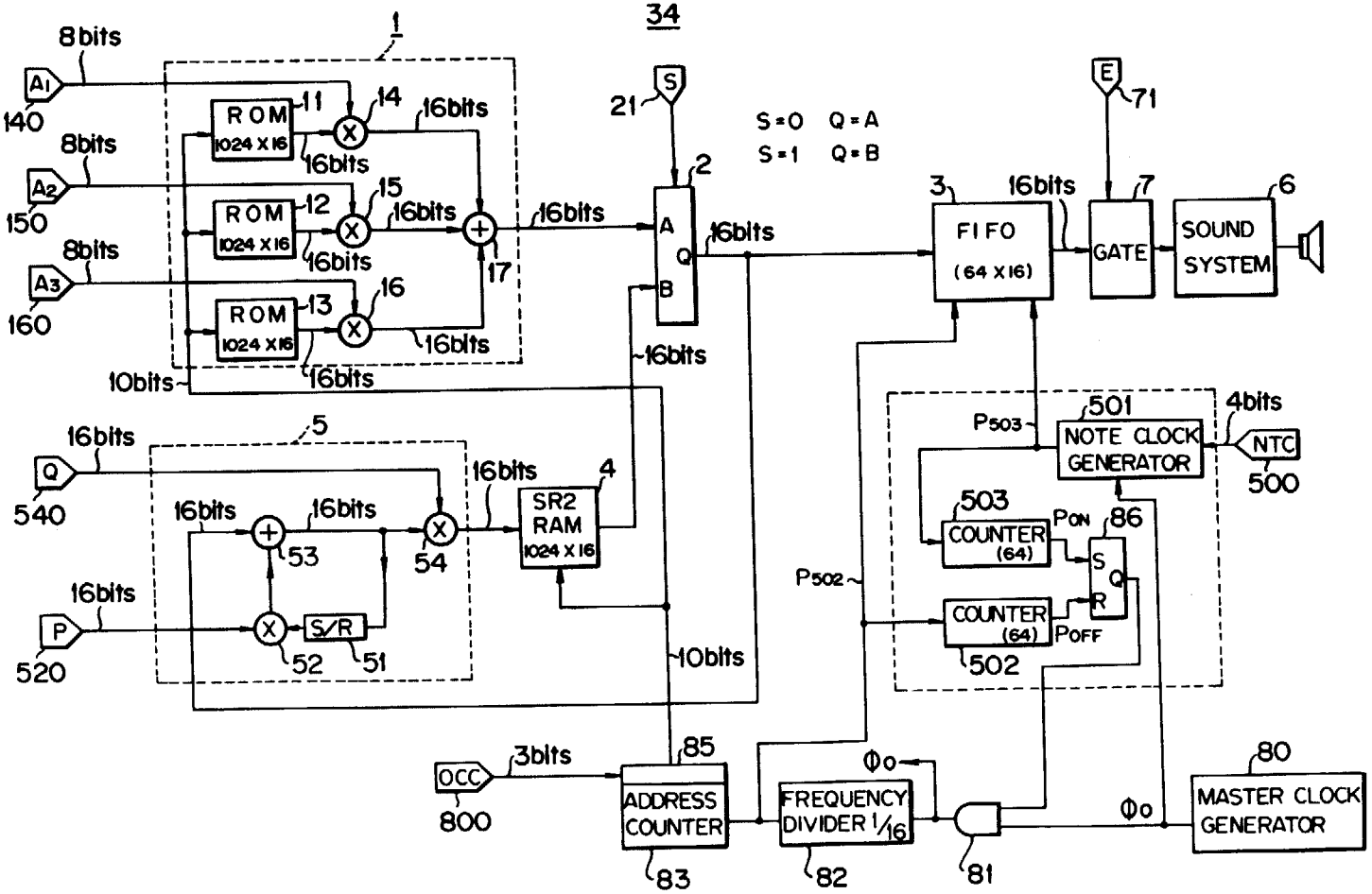
FIG. 2 is a block diagram of an embodiment of a tone generator unit in accordance with the present invention.

Now referring to FIG. 2, there is shown a block diagram of an embodiment of a tone generator unit in accordance with this invention. In general, a musical tone has an attack, a decay, and a release period. The attack period is initiated when the instrument key is closed and the amplitude of the musical tone increases in this period. The release period is initiated when the instrument key is released and the amplitude of the musical tone decreases and is terminated in this period. Usually, there is a period between this attack and release period, and this period will be called as a decay period in this specification. In the decay period, the amplitude of the musical tone gradually decreases.

In many of the heretofore known electronic musical instruments, each tone waveshape is maintained in a similar figure throughout these attack, decay, and release periods, only the amplitude of the tone waveshape being modulated by the envelope waveforms. This similarity of the tone waveshapes had made it difficult for the heretofore known electronic musical instruments to simulate the desired tone qualities produced by such natural musical instruments as a piano, a harp, and a xylophone.

In the tone generator unit 34 of this invention, the freedom in selecting and changing the algorithms and the parameters affecting the waveshapes is substantially increased owing to the computer control system as described in connection with FIG. 1. And therefore, an example of the tone generator unit which can generate varying waveshapes is illustrated in FIG. 2. The change in the tone waveshape during the attack, decay, release periods means the change in the harmonic contents during these periods, and is very advantageous for producing a desired tone quality.

In the embodiment shown by FIG. 2, the data codes stored in the registers of the tone generator unit 34 comprise: an octave code OCC which represents the octave to which the frequency of the generated tone belongs, OCC being stored in a register 800;

a note code NTC which specifies a particular tone in the twelve notes in an octave, NTC being stored in a register 500;

parameter codes $A_1$, $A_2$, $A_3$ for determining the initial tone waveshape, these codes being stored in registers 140, 150, 160 respectively;

parameter codes P, Q for determining the characteristics of a digital filter 5, these codes being stored in registers 520, 540 respectively;

a tone waveshape changeover code (one bit code) S stored in a register 21; and a sound output enable code (one bit code) E stored in a register 71.

The generation of these codes will be described in later paragraphs.

Throughout the following descriptions, the twelve-notes-per-octave system of an equal temperament will be assumed. The purpose of this assumption is to simplify the explanations, and it will become obvious from the following descriptions that the electronic musical instrument of this invention can employ any system other than the twelve notes system.

A dotted line block 1 in FIG. 2 is an initial waveshape generator means, and in this embodiment, the initial waveshape generator means 1 comprises three read-only-memory means (ROM), ROM 11, ROM 12, ROM 13, three multiplier circuits 14, 15, 16, and an adder circuit 17. ROM 11, ROM 12, and ROM 13 stores mutually different memories corresponding to mutually different waveshapes. As a numerical example for explanation, these ROMs are assumed to have 1,024 words, each word being constituted by 16 bits representing the amplitude of the 1,024 points which evenly divide one cycle period of a waveshape. These 1,024 words are stored in the order of the phase angle of the sample point, and these three ROMs are read out simultaneously by a same address which will be explained in later paragraphs. Each output of these ROMs is multiplied by the corresponding parameter $A_1$, $A_2$, or $A_3$ at the respective multiplier circuit 14, 15, 16, and the three products are added at the adder circuit 17 to produce the initial waveshape.

And therefore, the initial waveshape can be changed by changing the parameters $A_1$, $A_2$, $A_3$. But it must be understood that any type of a tone generator may be used for the initial waveshape generator 1.

Numeral 2 is a waveshape selector which is controlled by the tone waveshape changeover signal S. Numeral 4 represents a shift register, and a dotted line block 5 is a digital filter. This digital filter 5 and the shift register 4 constitute a circuit in which the digital code representing one cycle period of the waveshape is circulated and the harmonic contents of the circulated waveshape is successively changed in accordance with the characteristic of the digital filter 5. In the embodiment shown by FIG. 2, the digital filter 5 comprises a shift register (S/R) 51, multiplier circuits 52, 54, and an adder circuit 53. The parameters of the multiplication, P, Q will determine the characteristic of this digital filter 5.

The embodiment of FIG. 2 is characterized in that the rate of the waveshape generation is kept constant irrespective of the fundamental frequency of the generated musical tone. This constant rate of the waveshape generation simplifies the waveshape generation circuits and increases the reliability of the performance of these circuits. In order to keep the rate of the waveshape generation constant, a first-in-first-out (FIFO) type memory 3 in FIG. 2 is employed in this embodiment. Numeral 6 is a sound system, and numeral 7 is a gate means for controlling the input to the second system 6, the gate 7 being controlled by the sound output enable signal E.

Numeral 80 is a master clock pulse generator, numeral 81 is an AND gate, numeral 82 is a divider, numeral 83 is an address counter, numeral 85 is a control means for the output connection of the address counter 83, numeral 86 is a set-reset flipflop, numeral 501 is a note clock generator, numeral 502 is a counter for controlling the writing of the FIFO 3, and numeral 503 is a counter for controlling the reading of the FIFO 3.

And in the embodiment of FIG. 2, in order to keep a constant writing rate to the FIFO 3, the number of the words representing one complete cycle (or the number of sample points in one complate cycle) of a waveshape is charged in accordance with the OCC code. For the purpose of the following explanation, a numerical example of the number of words for one cycle of the waveshape is shown in Table 2.

TABLE 2

| OCC | Octave of the Tone | Number of Words for One Complete Cycle |
|---|---|---|
| 000 | $A_1 \sim G_1\#$ | 1,024 |
| 001 | $A_2 \sim G_2\#$ | 512 |
| 010 | $A_3 \sim G_3\#$ | 256 |
| 011 | $A_4 \sim G_4\#$ | 128 |
| 100 | $A_5 \sim G_5\#$ | 64 |
| 101 | $A_6 \sim G_6\#$ | 32 |
| 110 | $A_7 \sim G_7\#$ | 16 |

TABLE 2-continued

| OCC | Octave of the Tone | Number of Words for One Complete Cycle |
|---|---|---|
| 111 | $A_8 \sim C_9$ | 8 |

For the numeral example of Table 2, the master clock frequency generated by the pulse generator 80 is set at a value which is near to 2 MHz (hereinafter will be denoted by $\phi_0$ and will be called as 2 MHz for brevity). This $\phi_0$ pulse which passes the gate 81 intermittently (as will be described in later paragraphs) is employed as the master clock for the initial waveshape generator means 1, the digital filter 5, and the shift register 4. The intermittent clock pulse of the output of the gate 81 will be denoted by $\phi_G$. Since the ROMs 11, 12, 13 and the shift register 4 store 16 bit words, the clock $\phi_G$ is divided by 16 by the divider 82, and is input to the address counter 83. Thus, the change of the address and the clock are mutually synchronized in the initial waveshape generator means 1 and in the shift register 4.

Figures 3, 4:
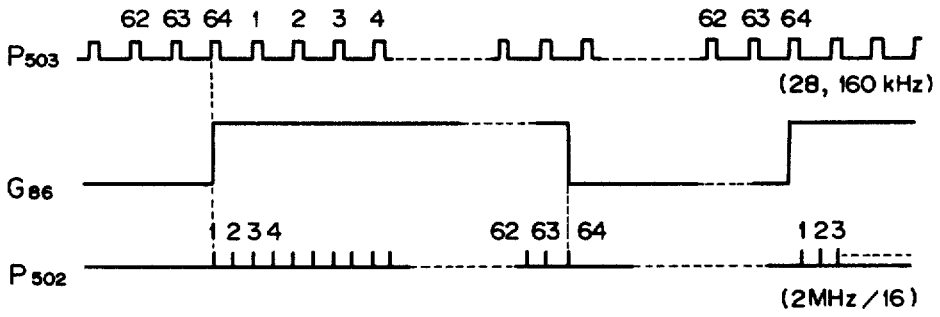
FIG. 3 shows a schematic connection diagram of the control means for the output connection of the address counter of the tone generator unit shown in FIG. 2.
FIG. 4 shows an example of the performance time chart of the FIFO in the tone generator unit of FIG. 2.

In the embodiment of FIG. 2, the address counter 83 has 10 cascaded binary stages, and the parallel output of this counter 83 are connected as shown by FIG. 3, through the control means 85 for the output connection of the address counter. In FIG. 3, $c_9, c_8, \ldots c_1, c_0$ means the parallel output of the address counter 83 as arranged from the MSB to the LSB, and $a_9, a_8, \ldots a_1, a_0$ means the address for reading the ROMs 11, 12, 13 and the addresses for writing and reading the shift register 4, since the shift register 4 in this embodiment is assumed to be a RAM (random access memory). The address $a_9, a_8, \ldots a_1, a_0$ is also arranged from the MSB to the LSB. For one example, when the OCC is at a logic "$\phi$", $c_5, c_4, \ldots c_1, c_0$ are output as $a_9, a_8, \ldots a_5, a_4$ and the logic "0, 0, 0, 0" are output for $a_3, a_2, a_1, a_0$; and therefore, for each one input pulse (2 MHz/16) to the address counter 83, addresses of the ROMs 11, 12, 13 and the RAM 4 will be progressed by 16 (corresponding to the $a_4$ bit which is the $c_0$ bit), and the words at addresses 0, 16, 32, . . . 992, 1008 are read out constituting one complete cycle of the waveshape by 64 words as shown in Table 2.

The output of the waveshape selector 2 will be either the initial waveshape from the adder 17 or the circulated and changing waveshape from the RAM 4 as selected by the signal S. This output of the waveshape selector 2 is input to the FIFO 3. As a numerical example for brevity of description, the FIFO 3 is assumed to have 64 word memory of 16 bit word. The writing rate to the FIFO 3 is 2 MHz per bit or 2 MHz/16 per word, and the FIFO 3 is read out continually by a variable reading rate corresponding to the NTC, and the reading rate being always lower than the writing rate. Therefore the writing must be interrupted in order to wait the progress of the reading, and this waiting is controlled by the gate 81.

Table 3 shows an example of the generated frequency of the note clock generator 501.

TABLE 3

| NTC | Tone | Frequency of the Note Clock |
|---|---|---|
| 0000 | A | 28.160 = 440.0 × 64 |
| 0001 | A# | 29.834 ≈ 466.2 × 64 |
| 0010 | B | 31.608 ≈ 493.9 × 64 |
| 0011 | C | 33.488 ≈ 523.2 × 64 |
| 0100 | C# | 35.479 ≈ 554.4 × 64 |
| 0101 | D | 37.589 ≈ 587.3 × 64 |
| 0110 | D# | 39.824 ≈ 622.2 × 64 |
| 0111 | E | 42.192 ≈ 659.3 × 64 |
| 1000 | F | 44.701 ≈ 698.5 × 64 |
| 1001 | F# | 47.359 ≈ 740.0 × 64 |
| 1010 | G | 50.175 ≈ 784.0 × 64 |
| 1011 | G# | 53.158 ≈ 830.6 × 64 |

The frequency of the note clock is controlled by the NTC. In the generation of the note clock as listed by Table 3, any heretofore known variable frequency generator means may be employed, and in the embodiment of FIG. 2, it is assumed that the master clock pulse $\phi_0$ is frequency-divided to produce the frequencies which are approximately equal to the corresponding frequencies in Table 3, the ratio of the frequency division being controlled by the code NTC. All the note frequencies as listed in Table 3 are lower than the writing frequency of the FIFO 3 which is 2 MHz/16 = 125 kHz.

The interruption of the writing to the FIFO 3 will be described in connection with FIG. 4, where an example of the performance time chart is illustrated. In FIG. 4, the pulse $P_{503}$ represents an example of the output pulse of the note clock generator 501 which is the input pulse to the counter 503 for controlling the reading of the FIFO 3. When the counter 503 counts 64 input pulses, the series output $P_{ON}$ from the counter 503 triggers-on the flipflop 86 and opens the gate 81. Now the clock pulse $\phi_G$ is transmitted, the waveshape generation is recommenced, and the output from the waveshape selector 2 is written to the FIFO 3. The pulse $P_{502}$ in FIG. 4 shows the output pulse from the divider 82, which is the input pulse to the counter 502 for controlling the writing of the FIFO 3.

As the frequency of the pulse $P_{503}$ is always lower than the frequency of the pulse $P_{502}$, when the number one pulse of the $P_{503}$ pulses arrives to the FIFO 3, there will be at least one word in the FIFO 3 which is written by the number one pulse of the $P_{502}$ pulse, and therefore the reading of the FIFO will not be interrupted. The waveform $G_{86}$ in FIG. 4 shows the output logic of the flipflop 86, and during the time when this logic is at "1", the writing and the reading of the FIFO 3 are executed simultaneously. When the counter 502 counts 64 input pulses, the series output $P_{OFF}$ from the counter 502 triggers-off the flipflop 86 and closes the gate 81. The writing to the FIFO 3 is interrupted until the next $P_{ON}$ pulse. In this way, the writing to the FIFO 3 is interrupted for each 64 words, which corresponds to 64/1024 cycle of a tone waveshape when the OCC is at "0, 0, 0" or to 64/16 cycles of a tone waveshape when the OCC is at "1, 1, 0".

The fundamental frequency of the produced tone wave is determined by the codes OCC and NTC. For example, when the NTC is at logic "0, 0, 0, 0", the frequency of the $P_{503}$ pulse will be 28.160 kHz, and since one cycle is composed of 1024 words when the OCC is at "0, 0, 0", the one cycle of the waveshape is read out at a rate of 28.16 kHz/1024 = 27.5 Hz, generating a tone of 27.5 Hz. When the OCC is changed to "1, 1, 0" with the NTC at "0, 0, 0, 0", the one cycle of the waveshape will be read out at a rate of 28.16 kHz/16 = 1760 Hz.

Thus, the digital code representing the amplitude of the sample points of a waveshape is read out from the FIFO 3, and is input to the gate 7 which is controlled by the signal E. The output of the gate 7 is converted to an analog waveform, further modified by effect circuits when necessary, and is converted to a sound wave in the sound system 6. The sound system is heretofore well known and will need no further description.

In one modified embodiment of the tone generator unit 34, the waveshape selector 2 may be replaced by an adder (not shown in the drawing) which adds the output of the initial waveshape from the adder circuit 17 to the output of the circulated waveshape from the RAM 4. The added sum is input to the FIFO 3 and is, in parallel transmitted to the input of the digital filter 5 to be recirculated.

Figure 5:
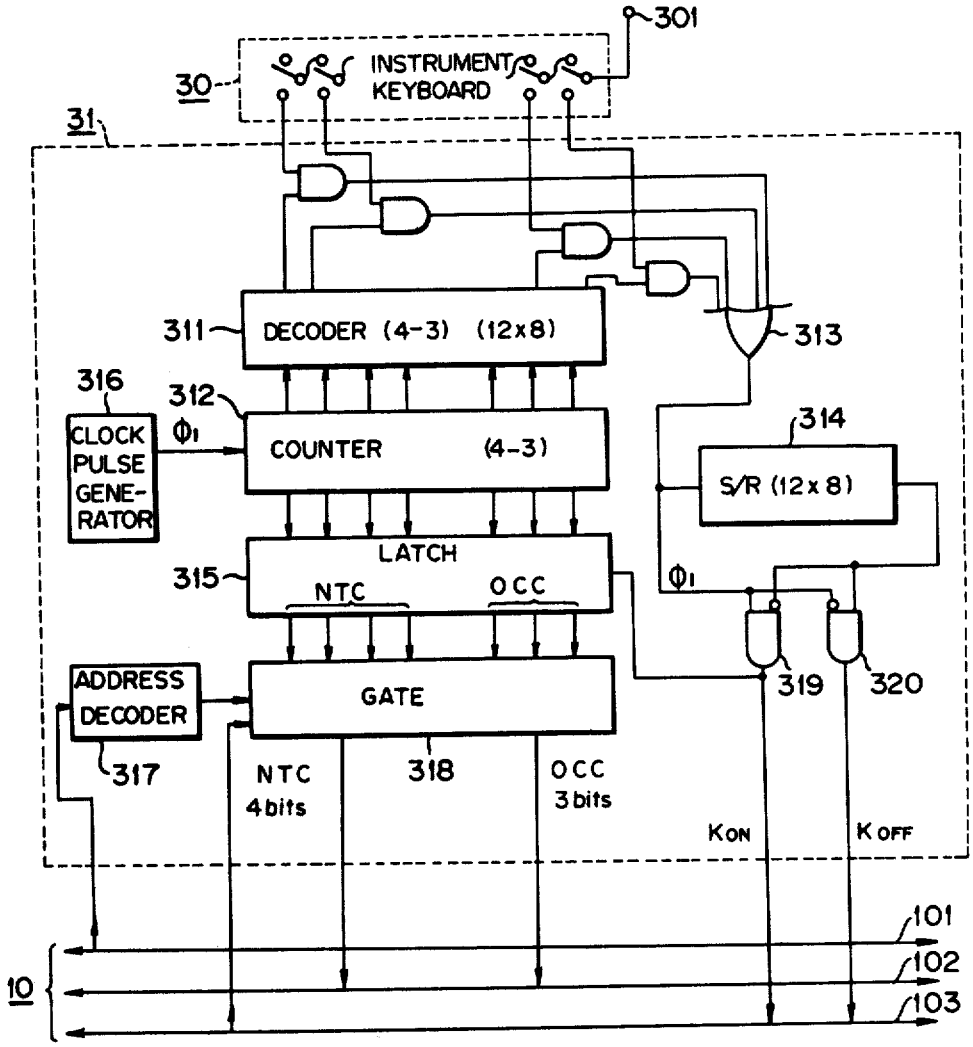
FIG. 5 is a block diagram of an embodiment of the instrument keyboard unit and its interface in accordance with the present invention.

Now, one embodiment for producing these codes $A_1$, $A_2$, $A_3$, P, Q, S, E, OCC, NTC in FIG. 2 will be described. FIG. 5 is a block diagram of an embodiment of the instrument keyboard unit 30 and its interface 31 in accordance with the present invention. In the embodiment as shown in FIG. 5, the common data bus is shown as divided into three lines, an address line 101, a data line 102, and a control line 103. It is obvious that the common data bus 10 of this invention may take any form in accordance with the design requirements.

In FIG. 5, numeral 316 is a clock pulse generator for scanning the key switches, numeral 312 is a counter, numeral 311 is a decoder, numeral 313 is an OR gate, numeral 314 is a shift register, and numeral 315 is a latch. The clock pulse generator 316, the counter 312, the decoder 311, the gate 313, the shift register 314, and the latch 315 constitute a keyswitch state detector means. The lowest four binary stages of the counter 312 are connected in a scale-of-12 fashion corresponding to the 12 kinds of the code NTC, and the decoder 311 has a corresponding connection. In this connection, the lower 4 bits of the latch 315 represent the code NTC, and the following three bits of the latch 315 represent the code OCC.

In the embodiment shown by FIG. 5, it is assumed that respective connection priority is assigned to each one of the key switches in the instrument keyboard unit 30, and that all the key switches are connected in a preference network manner according to the respective priorities. Therefore, of all the key switches closed at a same time, only the key switch which has the highest priority, is connected to the logic "1" signal as shown in FIG. 5. The logic "1" signal is also output successively at each terminal of the decoder 311. Therefore, the logic "1"0 signal from the instrument keyboard is output through one of the AND gates and then through the OR gate 313. The shift register 314 is for delaying this logic "1" signal for one complete cycle of the scanning. Therefore the output of a gate 319 means that a logic "1" signal has appeared for a key switch where there was logic "0" signal in the preceeding scanning, and this output is used for the key-on signal as denoted by $K_{ON}$; and the output of a gate 320 means that a logic "1" signal which was in the preceeding scanning has disappeared in this scanning, and this output is used for the key-off signal as denoted by $K_{OFF}$.

By the $K_{ON}$ signal, the contents of the counter 312 is input to the latch 315, and therefore the output of the latch 315 will be the NTC and the OCC as described in the forgoing paragraphs. The output of the latch 315 will be transmitted to the data line 102 when a predetermined address signal is received at the address decoder 317 from the address line 101. A gate 318 is provided between the output of the latch 315 and the data line 102, and the gate 318 is controlled by a gate enable signal from the control line 103.

Figure 6:
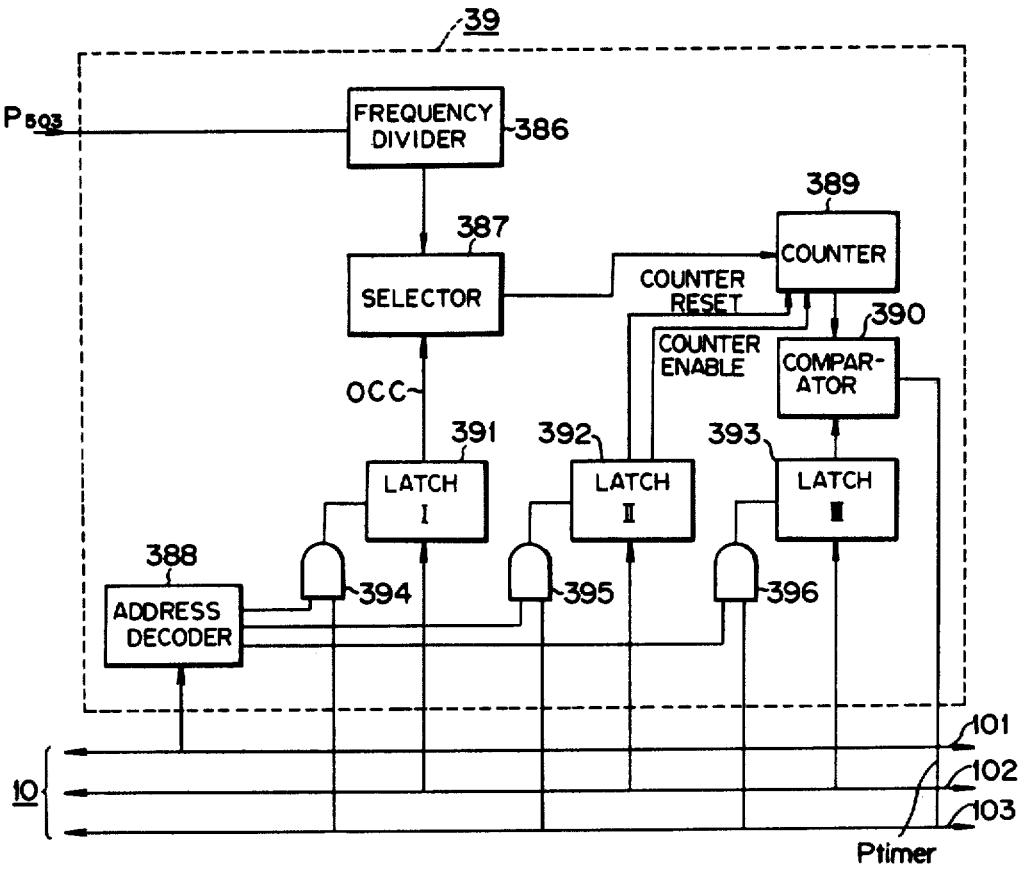
FIG. 6 is a block diagram of an embodiment of a timing circuit in accordance with the present invention.

A block diagram of an embodiment of the timing circuit 39 in accordance with this invention is shown in FIG. 6. In FIG. 6, numeral 386 is a frequency divider, numeral 387 is a selector, numeral 388 is an address decoder, numeral 389 is a counter, numeral 390 is a comparator, numerals 391, 392, 393 are respectively latches, and numerals 394, 395, 396 are respectively AND gates. The performance of the timing circuit shown by FIG. 6 will be described in connection with the drawings of FIG. 7 and FIG. 8.

Figure 7:
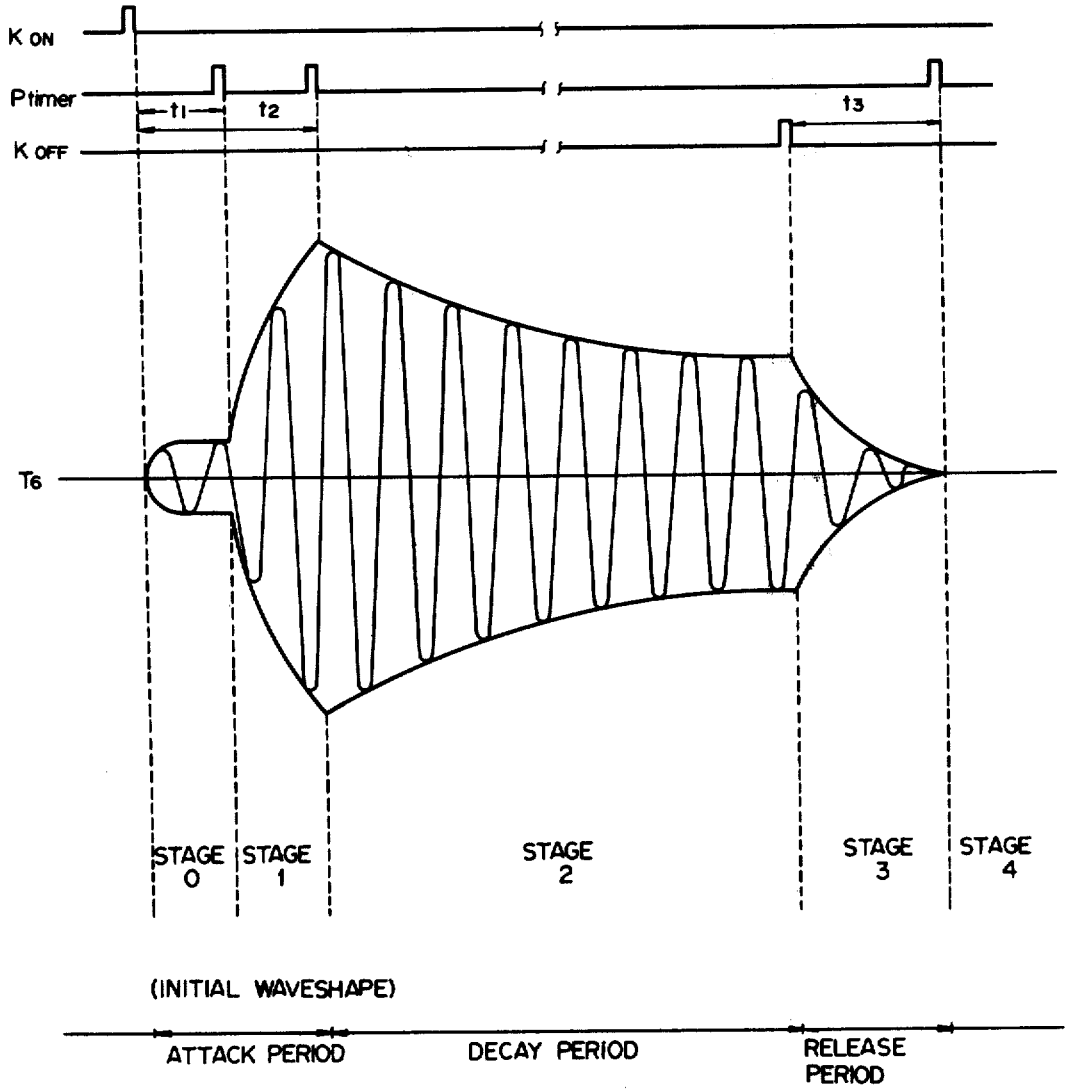
FIG. 7 is a waveform diagram illustrating an example of a tone waveshape which is generated in the tone generator unit of FIG. 2.
Figure 8:
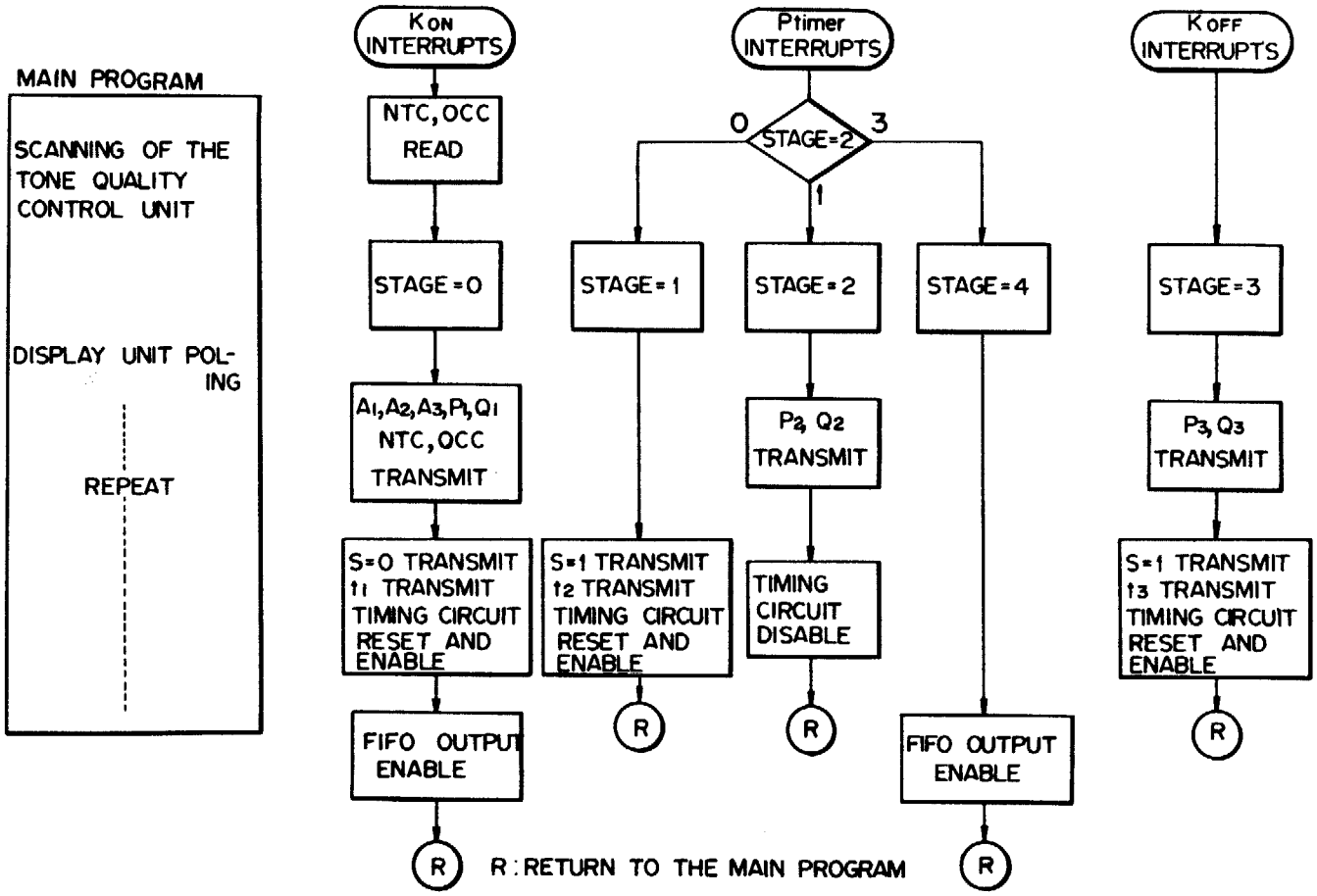
FIG. 8 shows an example of a flow chart illustrating the interruptions of the program executed in an embodiment of this invention.

FIG. 7 shows a waveform diagram illustrating an example of a tone waveshape controlled by the timing circuit of FIG. 6, and FIG. 8 shows an example of a flow chart illustrating the interruptions of the programs for generating the waveform as shown by FIG. 7.

Referring first to FIG. 8, the main program executed in the CPU 20 will be the repetition of the scanning for the tone quality control unit 32 and the poling of the display unit 35; and, when a program interruption is finished, the program is returned to this main program.

An interruption will be initiated by the signal $K_{ON}$ (refer to FIG. 5), and the address is transmitted to the address decoder 317 to write in the codes NTC and OCC through the gate 318. In the next step, stage=0 is set as the initial value of the stage. Then the CPU 20 will transmit the codes $A_1$, $A_2$, $A_3$, NTC, OCC, P, Q corresponding to the stage=0 through the common data bus 10. The values of P, Q in this stage will be represented by $P_1$, $Q_1$. These codes are stored in the corresponding registers 140, 150, 160, 500, 800, 520, 540 in the tone generator unit 34, and the code OCC is also stored in the latch 391 (refer to FIG. 6). In the following step, the CPU 20 will transmit the signal S at the logic "0", a code $t_1$ representing the value of a first time interval, and the timing circuit reset and enable signal. The signal S is stored in the register 21 (refer to FIG. 2), the code $t_1$ is stored in the latch 393 and the timing circuit reset and enable signal is stored in the latch 392 (refer to FIG. 6). In the last step, the signal E is transmitted to be stored in the register 71. Then the program is returned to the main program. Thus, all the data registers 140, 150, 160, 500, 800, 520, 540, 21, and 71 in the tone generator unit 34 are provided with the new data, and a musical tone is generated as previously described in connection with FIG. 2. This stage is denoted by stage=0 in FIG. 7.

Again referring to FIG. 6, the input of the divider 386 is the $P_{503}$ pulse whose frequency is as listed in Table 3, and this divider 386 comprises cascaded binaries, each output of these cascaded binaries being input to the selector 387. One of these parallel output of the divider 386 is selected as the output of the selector 387 in accordance with the code OCC from the latch 391, in such a way as the output pulse frequency is divided by one more binary counter stage when the code OCC represents one stage lower octave. Thus the frequency of the output pulse from the selector 387 is proportional to the generated tone frequency, and this output pulse from the selector 387 is used as the unit of the time scale in the timing circuit 39. Therefore, the generated envelope waveform has a time scale proportional to one cycle length of the tone waveshape. The counter 389 counts the output pulse of the selector 387, and the parallel output of the counter 389 is compared to the code $t_1$ from the latch 393. Since the counter 389 is reset and enabled by the signal from the latch 392 which is loaded at the interruption by the pulse $K_{ON}$, the parallel output of the counter 389 will become equal to the output of the latch 393 after a time $t_1$ (measured by the period of the output pulse of the selector 387), and the comparator 390 will transmit a $P_{timer}$ pulse to the control line 103. The $P_{timer}$ pulse interrupts the program.

Returning to FIG. 8, when the $P_{timer}$ pulse interrupts, the state of the stage is decided. When the stage=0, the stage is advanced to the stage=1, and then logic "1" for the signal S, a code $t_2$ representing the value of a second time interval, and the timing circuit reset and enable signal are transmitted. Then the program is returned to the main program. When the signal S is at logic "1", the selector 2 selects the circulated waveshape from the RAM 4, and the waveshapes shown the stage=1 in FIG. 7 for example are generated. Meanwhile the parallel output of the counter 389 will become equal to the code $t_2$ stored in the latch 393, and a $P_{timer}$ pulse will again be transmitted. When the stage=1 at the $P_{timer}$ pulse interruption, the stage is advanced to the stage=2, and new P, Q codes as denoted by $P_2$, $Q_2$ in FIG. 8 are transmitted together with the timing circuit disable signal, and then the program is returned to the main program. Waveshapes will be gradually changed in accordance with the parameters $P_2$, $Q_2$, and for example, the waveshapes shown as the stage=2 in FIG. 7 will be generated. Since the timing circuit 39 is disabled, the stage=2 continues until the signal $K_{OFF}$ interrupts the program. When the signal $K_{OFF}$ interrupts, the stage is set to the stage=3, and the codes P, Q corresponding to the stage=3, which are denoted by $P_3$, $Q_3$ in FIG. 8 are transmitted. Then signal S at logic "1", and the timing circuit reset and enable signal are transmitted. After this, the program is returned to the main program. The waveshapes indicated in the stage=3 of FIG. 7 are generated, and when the contents of the counter 389 coincides with the code $t_3$, the $P_{timer}$ pulse is again generated and the program is interrupted. At this interruption, as the stage=3, the stage is set to the stage=4, and the gate disable signal E is transmitted, and then the program is returned to the main program.

When the player of this musical instrument wishes to change parameters $A_1$, $A_2$, $A_3$, P, Q, or when the player wishes to change the control program of the CPU 20, he can manipulate the switches and controls on the tone quality control unit 32 or on the CPU control unit 24, and then the program is interrupted and the new data or the new program will be read out.

Although the foregoing descriptions have been on a particular embodiment of this invention, it will be easily understood from these descriptions that the freedom in setting and changing the generated waveshapes is substantially increased by this invention. And it should be understood that a variety of changes and modifications may be made in the invention without departing from the spirit and scope of this invention.

A most simple modification is a parallel connection of two or more than two tone generator units to the same common data bus 10. To these parallel connected tone generator units, same NTC, OCC codes and same $A_1$, $A_2$, $A_3$, P, Q codes may be input same waveshapes of a same frequency. Or in one alternative, same NTC, OCC codes, but different $A_1$, $A_2$, $A_3$, P, Q codes may be input to generate different waveshapes of a same frequency. Or in another modification, musical tones of different frequencies may be generated simultaneously. The embodiment of the tone generator unit 34 shown by FIG. 2 can generate only a single frequency tone at a time determined by the codes NTC, OCC. But the instrument keyboard unit 30 and its interface 31 shown by FIG. 5 will be easily modified to a system where plural keys are simultaneously pressed, and plural sets of NTC, OCC codes are generated at a time with the corresponding $K_{ON}$, $K_{OFF}$ signals. When plural sets of the tone generator units are connected in parallel to the common data bus 10, and each one set of the NTC, OCC codes is input to each tone generator unit, the system can generate musical tones of different frequencies at a time.

The MODEM 38 is used for transmitting the signals on the common data bus 10 to a remote place through a communication channel or for recording the signals on the common data bus 10 on a magnetic tape recorder to be reproduced at a desired time. Thus the system of the electronic musical instrument of this invention will be expanded by the use of the MODEM 38.

What is claimed is:

1. An electronic musical instrument comprising:

a central processing unit having arithmetic logics, control circuits, and registers, memories for storing the programs related to the data processing by said central processing unit, and the necessary data for controlling the generation of a musical tone, a CPU control unit for transmitting control signals to said central processing unit, a common data bus to which said central processing unit, said memories, and said CPU control unit are connected, terminal units connected to said common data bus, said terminal units including equipments for producing musical tones and comprising at least a tone generator unit, a tone quality control unit, an instrument keyboard unit, key on-off signals generated at said instrument keyboard unit and tone quality control signals selected at said tone quality control unit being processed to produce a musical tone at said tone generator unit corresponding to said key on-off signals and said selected tone quality control signals, and wherein:

said tone generator unit has a digital filter, the output of said digital filter being connected to the input of said digital filter after a predetermined time delay, constituting a recycling circuit for a digital code, a digital representation of a waveshape being first input to said digital filter as the initial value of said recycling digital code.

2. An electronic musical instrument according to claim 1 wherein said terminal units further comprises at least one MODEM unit connected to said common data bus, said MODEM unit modulating or demodulating the signals on or to said common data bus for transmitting and/or for recording said signals on or to said common data bus.

3. An electronic musical instrument according to claim 1 wherein said terminal units further comprises a display unit connected to said common data bus for displaying status of said electronic musical instrument.

4. An electronic musical instrument according to claim 1 wherein said terminal units includes plural tone generator units.

5. An electronic musical instrument comprising:

a central processing unit having arithmetic logics, control circuits, and registers, memories for storing the programs related to the data processing by said central processing unit, and the necessary data for controlling the generation of a musical tone, a CPU control unit for transmitting control signals to said central processing unit, a common data bus to which said central processing unit, said memories, and said CPU control unit are connected, terminal units connected to said common data bus, said terminal units including equipments for producing musical tones and comprising at least a tone generator unit, a tone quality control unit, an instrument keyboard unit, key on-off signals generated at said instrument keyboard unit and tone quality control signals selected at said tone quality control unit being processed to produce a musical tone at said tone generator unit corresponding to said key on-off signals and said selected tone quality control signals, and wherein:

said tone generator unit has a digital filter, the output of said digital filter being delayed by a predetermined time and being summed by a digital representation of a waveshape to compose an output of a resultant waveshape, and said output of said resultant waveshape being connected to the input of said digital filter, constituting a recycling circuit.

6. An electronic musical instrument comprising:

a central processing unit having arithmetic logics, control circuits, and registers, memories for storing the programs related to the data processing by said central processing unit, and the necesary data for controlling the generation of a musical tone, a CPU control unit for transmitting control signals to said central processing unit, a common data bus to which said central processing unit, said memories, and said CPU control unit are connected, terminal units connected to said common data bus, said terminal units including equipments for producing musical tones and comprising at least a tone generator unit, a tone quality control unit, an instrument keyboard unit, key on-off signals generated at said instrument keyboard unit and tone quality control signals selected at said tone quality control unit being processed to produce a musical tone at said tone generator unit corresponding to said key on-off signals and said selected tone quality control signals, and wherein:

said tone generator unit has a digital waveshape generator that produces a digital code representing a musical waveshape, and a first-in-first-out type memory, said first-in-first-out type memory being intermittently written by the digital code representing a waveshape at a constant writing rate, and said first-in-first-out type memory being continually read out at a variable rate corresponding to the fundamental [read out at a variable rate corresponding to the fundamental] frequency of the musical tone to be generated, said variable rate being always lower than said constant writing rate.

7. An electronic musical instrument according to claim 1 wherein said tone generator unit has a control circuit which changes the number of sample points for a complete one cycle of a waveshape when said waveshape is represented by a digital code, said number of said sample points being halved when the fundamental frequency of the musical tone to be generated is raised by one octave.

8. A tone generator comprising:

an initial waveshape generator for providing at regular clock intervals successive digital amplitude samples of a musical waveshape, digital filter means, connected to receive and digitally filter said amplitude samples from said waveshape generator, for producing a resultant set of amplitude samples of a digitally filtered musical waveshape, sound system conversion means for converting digital amplitude samples to musical tones, and waveshape selector means for selectively providing to said sound system conversion means either the amplitude samples from said initial waveshape generator or the amplitude samples from said digital filter means, said conversion means thereby selectively producing two corresponding musical tones of different tonal quality.

9. A tone generator according to claim 8 wherein:

said initial waveshape generator produces amplitude samples of a musical waveshape that is established by a first set of digital parameter codes, wherein:

said digital filter means has filter parameters which are established by a second set of digital parameter codes, wherein:

said waveshape selector means is responsive to a waveshape changeover code, together with:

computer control means, connected to said initial waveshape generator, said digital filter and said selector means, for programmatically providing said first set of digital parameter codes to said initial waveshape generator, said second set of parameter codes to said filter, and said changeover code to said selector means, said computer control means thereby programmatically controlling the tonal quality of the musical tones produced by said tone generator.

10. A tone generator according to claim 9 wherein said initial waveshape generator comprises:

a plurality of memories each storing the amplitude samples of a corresponding waveshape, addressing means for accessing successive amplitude samples concurrently from each of said plurality of memories at said regular clock intervals, a like plurality of multipliers, each connected to an associated one of said memories, for multiplying each amplitude sample accessed from said associated memory by a multiplier value established by a corresponding one of said first set of parameter codes, and combining means for combining the multiplied accessed amplitude samples from all of said memories to provide said intial waveshape generator amplitude samples.

11. A tone generator according to claim 10 wherein said digital filter means is connected to receive and filter amplitude samples from the output of said waveshape selector means, said filter means including a "filtered waveshape" memory for storing digitally filtered amplitude samples, said addressing means also being connected to access successive digitally filtered amplitude samples from said "filtered waveshape" memory, said accessed filtered amplitude samples being supplied to said waveshape selector means.

12. A tone generator according to claim 11 wherein said sound system conversion means includes:

a first in, first out memory connected to receive amplitude samples from said waveshape selector means, note clock rate access means, connected to said first in, first out memory and operative in response to a selected note, for causing said first in, first out memory to output amplitude samples stored therein at a rate associated with the frequency of said selected note, and a sound system for converting the amplitude samples output from said first in, first out memory to musical tones, said addressing means operating at a rate greater than said note frequency associated rate so that amplitude samples are supplied to said first in, first out memory faster than they are output therefrom.

13. A tone generator according to claim 11 wherein said plurality of memories and said "filtered waveshape" memory are accessed by an n-bit binary address code, said addressing means including:

an address counter advanced at a fixed clock rate, octave control means for producing a binary address code corresponding to certain subsets of the parallel output bits of said address counter, said subset being established in accordance with an octave control code supplied thereto.

14. A tone generator according to claim 8 wherein said digital filter means comprises:

a randomly accessible, shift-register type memory, the output of said memory being connected to one input of said selector means, and a digital filter having selectable filter parameters, the input of said digital filter being connected to the output of said selector means, the output of said digital filter being connected to the input of said shift register.

15. A tone generator comprising:

waveshape amplitude source means for supplying amplitude samples of a musical waveshape at a controlled supply rate, a first in, first out memory connected to receive and store the amplitude samples supplied from said source means, sound system means for converting amplitude samples output from said first in, first out memory to musical tones, and note clock controlled readout means, connected to said first in, first out memory, for causing said first in, first out memory to output amplitude samples to said sound system means at a readout rate related to the frequency of a selected musical note, said controlled supply rate being greater than said readout rate.

16. A tone generator according to claim 15 wherein said first in, first out memory has n amplitude sample storage locations, and further comprising:

input inhibit means, cooperatively connected to said source means and said note clock controlled readout means, for causing said source means to cease supplying said amplitude samples after each n amplitude samples have been supplied to and stored by said first in, first out memory, and for causing said source means again to start supplying amplitude samples after said stored n amplitude samples have been output from said first in, first out memory control of said note clock controlled readout means.

17. A tone generator according to claim 16 including a master clock generator producing system clock pulses at a first rate, said note clock controlled readout means receiving a note code indicative of said selected note and dividing said system clock pulses by a factor established by said received note code to obtain a frequency divided pulse train that sets the readout rate of said first in, first out memory, said source means including a divider for dividing said system clock pulses by a fixed value to establish said controlled supply rate.

18. A tone generator according to claim 15 wherein said source means comprises:

at least one memory storing waveshape amplitude samples, and a memory access control circuit for sequentially accessing said stored waveshape amplitude samples from said at least one memory at said controlled supply rate.

19. A computer controlled electronic musical instrument comprising:

at least one tone generator means for generating a musical tone having frequency and waveshape parameters established in response to supplied data codes defining these parameters, note selection means for providing interrupt signals indicative of selected tones to be generated, a programmable computer interconnected with said tone generator means and *said note selection means and programmable to provide* said parameter defining codes, and said computer including:

program storage and execution means for storing and executing a set of program instructions including a main program and one or more subroutines each directing the generation of certain frequency and/or waveshapes parameter defining codes, said main program including instructions for testing for the presence of interrupt signals, and program interrupt means, responsive to detection by said main program of interrupt signals from said note selection means, for causing said program storage and execution means to branch from execution of said main program to execution of a selected one of said subroutines, as determined by the type of interrupt signal, so as to cause said computer to supply to said tone generator means programmed sets of parameter defining codes thereby causing generation of a musical tone of selected frequency and having programmed parameter variation.

20. A computer controlled electronic musical instrument comprising:

at least one tone generator means for generating a musical tone having frequency and waveshape parameters established in response to supplied data codes defining these parameters, note selection means for providing signals indicative of selected tones to be generated, a programmable computer interconnected with said tone generator means and said note selection means and programmable to provide said parameter defining codes, and said computer including:

program interrupt means, responsive to signals from said note selection means for causing said computer to supply to said tone generator means programmed sets of parameter defining codes thereby causing generation of a musical tone of selected frequency and having programmed parameter variation, and wherein:

said note selection means provides signals indicative of tone initiation and release times, said instrument further comprising:

timer means, interconnected with said computer, for providing timer interrupt signals at intervals selectably related to said tone initiation and release signals provided by said note selection means, said program interrupt means being responsive to note initiation and termination signals from said note selection means and to timer interrupt signals from said timer means, so as to alter programmatically said parameter defining codes in response to any of such interrupts.

*21. A computer controlled electronic musical instrument comprising:*

*tone generator means for generating a musical tone having frequency and waveshape parameters established in response to supplied data codes defining these parameters, said tone generator means including means for holding such data codes supplied on a time shared basis;*

*note selection means for providing first signals indicative of a selected frequency of a tone to be generated;*

*tone quality control means for providing second signals indicative of selected tone quality to be imparted to the tone to be generated;*

*common data bus means to which said tone generator means, said note selection means and said tone quality control means are connected; and*

*a programmable, stored-program computer connected to said common data bus means whereby said tone generator means, said note selection means and said tone quality control means are connected to the computer via the common data bus means respectively;*

*said computer including program storage and execution means for storing and executing a set of electronic computation instructions which include;*

*a first subset of such instructions which, when executed, causes detection of said first signals with concomitant supply on a time shared basis through the data bus means to said tone generator means of a programmed set of the frequency parameter defining data codes; and*

*a second subset of such instructions which, when executed, causes detection of said second signals with concomitant supply on a time shared basis through the data bus means to said tone generator means of a programmed set of the waveshape parameter defining data codes, thereby causing generation of a musical tone of frequency selected by said note selection means and waveshape based on the tone quality selection of said tone quality control means.*

*22. An electronic musical instrument according to claim 21, in which said programmable computer further includes;*

*means for changing the instructions to by executed by said execution means thereby causing said computer to produce different ones of the parameter defining data codes in response to either of said first signals from said note selection means and said second signals from said tone quality control means.*

*23. A keyboard electronic musical instrument comprising:*

*a common bus via which all signals are communicated between components of said instrument,*

*a microprocessor stored program computer operatively connected to said bus,*

*a keyboard unit including a key switch matrix,*

*a tone quality control unit,*

*tone generator means,*

*said microprocessor computer, said keyboard unit, said tone quality control unit and said tone generator means each interfacing with said bus,*

*said microprocessor computer having program means for causing said microprocessor to respond to condition changes of said key switch matrix or said tone quality control unit, as signaled via said bus, and in response thereto, to transmit to said tone generator means, in time shared order via said bus, tone generation control signals indicative of or responsive to the changed condition of the respective key switch matrix and tone quality control unit.*

*24. An electronic musical instrument according to claim 23 wherein the signals communicated between said components via said bus include the following:*

*first signals transmitted from the keyboard unit to the microprocessor computer for producing on/off signals of actuated key switches in said matrix and associated key identification data,*

*second signals transmitted from the tone quality control circuit to the microprocessor computer for determining tone quality, and*

*third signals transmitted from the microprocessor computer to the tone generator means for controlling tone waveshape generation and for determining tone quality, said third signals being produced at the microprocessor computer according to said first and second signals.*

*25. An electronic musical instrument according to claim 23 or 24 wherein:*

*said tone generator means comprises plural tone generator units; and*

*signals are provided on said common bus in time shared multiplex fashion, together with:*

*demultiplexing means associated with each unit interfacing with said bus for causing communication from said bus to that unit only of signals directed to that specific unit.*

*26. An electronic musical instrument according to claim 24 wherein:*

*said tone generator means comprises plural tone generator units; and*

*said microprocessor computer transmits selected tone quality determining third signals in common to more than one tone generator unit for like tone color production thereby.*

*27. An electronic musical instrument according to claim 23 wherein said tone generator means comprises plural tone generator units, wherein each tone generator unit is configured to generate musical tones in accordance with a selectable one of a set of tone generation algorithms, wherein said tone generation control signals include algorithm selection data, and wherein each tone generator unit utilizes for musical tone generation the selected one algorithm specified by the algorithm selection data received by that tone generator unit, said algorithm selection data being alterable by said microprocessor computer during tone generation so that different portions of a single tone can be generated with different algorithms.*

*28. A keyboard electronic musical instrument comprising:*

*a common bus via which all data is communicated between components of said instrument,*

*a microprocessor stored program computer operatively connected to said bus,*

*a plurality of musical tone generators connected to said bus, each identified by a respective address,*

*a keyboard unit operatively connected to said bus to transmit to the microprocessor computer via said bus key data signals for actuated keys, and*

*program means, including a set of electronic computation instructions executed by said microprocessor stored program computer, for causing said microprocessor computer to recognize from said key data signals received via said bus a changed key switch state, and in response thereto to cause said microprocessor computer to produce a new or modified tone generation control signal and to transmit the same via said bus to a certain one of said tone generators, the address of which is associated with the actuated key by said microprocessor computer.*

*29. An electronic musical instrument according to claim 28 wherein:*

*said microprocessor computer associates a respective different tone generator to each actuated key, and wherein:*

*said program means causes said microprocessor computer to produce and transmit certain common waveshape controlling information via said bus to more than one of said different associated tone generators.*

*30. A keyboard electronic musical instrument comprising:*

*a common bus via which all data is communicated between components of said instrument,*

*a microprocessor stored program computer operatively connected to said bus,*

*musical tone generator means, connected to said bus, for generating tones in conformity with note code and waveshape data communicated thereto via said bus,*

*a keyboard switch state detector operatively connected to said bus, and configured to transmit to said bus first signals indicative of the changed state and identity of corresponding keys in said keyboard,*

*a tone quality control unit operatively connected to said bus and configured to transmit to said bus second signals for determining tone quality,*

*first program means, including a first set of electronic computation instructions stored and executed by said microprocessor computer, for causing said microprocessor computer to recognize from said first signals received via said bus a new key-on condition, and in response thereto to transmit via said bus the note code of the corresponding key to said tone generator means, and to recognize from said first signals a subsequent change in actuation state of the same key, and in response thereto to transmit via said bus to said tone generator means additional note production data, and*

*second program means, including a second set of electronic computation instructions stored and executed by said microprocessor computer, for causing said microprocessor computer to recognize from said second signals that the tone quality of the tones being generated is to be changed, and in response thereto to transmit via said bus to said tone generator means third signals for determining the tone quality, said tone generator means being configured to receive said third signals and to modify the tone quality of the tones generated thereby in accordance with said received signals,*

*whereby detection of actuated keys, detection of tone quality information, and generation of musical tones in conformity with these detected data are microprocessor computer controlled.*

*31. A keyboard electronic musical instrument according to claim 30 wherein:*

*said tone generator means comprises a plurality of tone generator units, each identified by a respective address, and each configured to generate a tone in conformity with respective note code and waveshape data communicated thereto,*

*said first program means including electronic computation instructions for causing said microprocessor computer to associate the address of a certain one of said tone generator units with a respective one of said corresponding keys,*

*said second program means including electronic computation instructions for causing said microprocessor computer to transmit each of said third signals to the respective one or more tone generator units the addresses of which have been associated by said microprocessor computer with certain corresponding keys.*

* * * * *